United States Patent [19]

Weber et al.

[11] 4,211,654
[45] Jul. 8, 1980

[54] APPARATUS FOR AEROBIC TREATMENT OF CONTAMINATED LIQUID

[76] Inventors: Raymond C. Weber, Box 108, Ligonier, Ind. 46767; Leslie A. Weber, R.R. #3, Albion, Ind. 46701

[21] Appl. No.: 930,899

[22] Filed: Aug. 4, 1978

[51] Int. Cl.$^2$ ............................................. C02C 1/02
[52] U.S. Cl. .................................. 210/104; 210/196; 210/202; 210/258
[58] Field of Search ........ 210/735, 104, 108, 123–125, 210/138, 139, 195 R, 195 S, 196, 200–203, 205, 220, 252, 254, 258

[56] References Cited

U.S. PATENT DOCUMENTS

| 4,021,347 | 5/1977 | Teller et al. | 210/203 X |
|---|---|---|---|
| 4,036,754 | 7/1977 | Peasley | 210/139 |
| 4,100,070 | 7/1978 | White | 210/202 X |
| 4,142,975 | 3/1979 | Kinzer | 210/220 X |

Primary Examiner—Thomas G. Wyse
Attorney, Agent, or Firm—John A. Young

[57] ABSTRACT

A waste treatment apparatus operated either by gravity or by positive displacement pump in which a variable inflow of contaminated liquid is aerated, clarified, and filtered. The filtered liquid is used to backwash one of at least a pair of rapid sand filters, while the other rapid sand filter is being utilized. The alternating cycle of backwashing and filtering by the respective rapid sand filters, all of which is integrated with overall filtering operation, insures that at least one filter is fully operative at any time.

The apparatus is adapted for variable inflow and can adapt to such unfavorable exigencies as overtaxing inflow and clogging at the rapid sand filter or at an earlier stage of contaminated liquid treatment. Sensors are located suitably throughout the apparatus to adjust the system to overflow conditions or clogged conditions, and the flows can be redirected through a preferred stage. The system is self-regulated and is responsive to critical conditions such as too little water for treatment, excessive inflow of contaminated liquid for treatment, clogged condition in the filters, clear well, etc.

The apparatus for treating the contaminated liquid is constructed from an elongated, curvilinear cross section pipe which is cut to length and compartmentalized interiorly for the various steps of aerating, clarifying, filtering, and chlorinating. Such pipe is readily available and is adapted for containing contaminated liquid and treatment thereof, and for subsurface installation.

9 Claims, 14 Drawing Figures

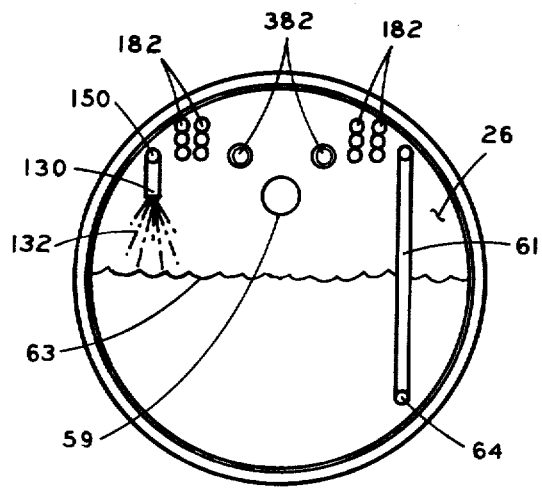
FIGURE 4
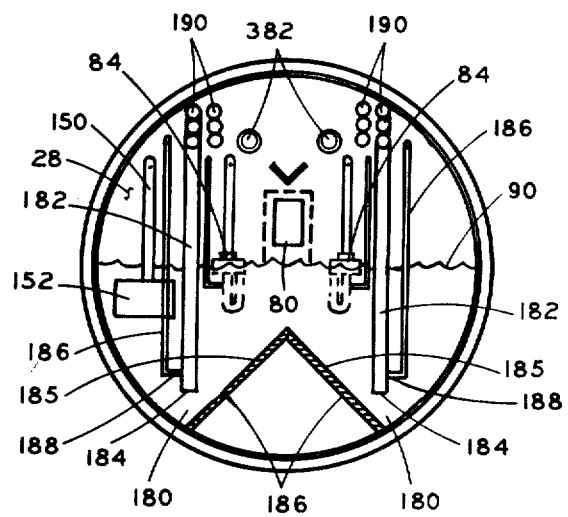
FIGURE 5
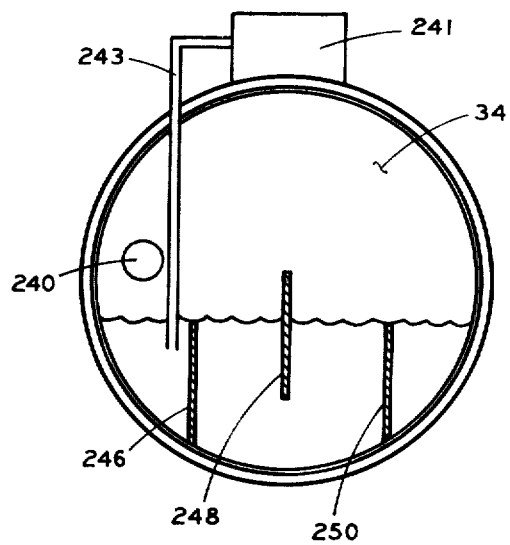
FIGURE 6
FIGURE 7

4,211,654

APPARATUS FOR AEROBIC TREATMENT OF CONTAMINATED LIQUID

BACKGROUND OF THE INVENTION

A relatively small apparatus employing a process for the aerobic treatment of contaminated liquids, has been the subject matter of many proposals, particularly in light of increasingly restrictive specifications for acceptable pollution control in the effluent from domestic and industrial sewage treatment apparatuses. The difficulty lies in achieving small-scale sewage treatment apparatuses, since they are frequently overwhelmed by sudden inflows of water or other liquids which are beyond the capacity of the system to handle. Of course, the systems must be designed for a given upper limit of fluid treatment in mind, but this should be as small as reasonably possible, otherwise the system is built to overcapacity. The difficulty comes on those rare occasions (because of coincidence of several events), when there is a sudden inflow of water for treatment by the process and apparatus which is beyond its normal capacity. In this event the prior art systems become overtaxed and require special reconditioning for further operation.

Many small-scale sewage treatment apparatuses for domestic and industrial use, contemplate the fabricating of the apparatus at the proposed site of use. This requires a crew of skilled assemblers and fabricators, entailing added expense in the way of installation, material shipment, etc.

In still other domestic and industrial water or other liquid treatment systems, there is no ready means for providing an efficient system of sensors whereby the operation can be continuously self-monitored so that in the event any portion of the system requires bypassing or cleaning for more efficient operation, such adjustments in flow and self-cleaning can be effected.

The overall technical problem which has thus far challenged the art, is the constructing and use of a modular type system which can be standardized and enlarged or contracted in capacity and fabricated from standard corrugated, curvilinear cross section pipe which is compartmentalized into surge tank, aeration chamber, clarifier, rapid sand filter, clear well and chlorinator tank, with the respective operations so interrelated that at least a portion of each discrete subsection is always in condition for operation, the overall system is continuously self-monitored, and fluid is thus routed for the most efficient operation.

In the aerobic treatment of contaminated liquid, provision must be made for the efficient mechanical and chemical dissolution of solid waste product which needs to be aerobically reduced and removed from the liquid phase portion. Removal occurs by way of filtration as well as chemical reduction, in a series of steps which are calculated to ultimately remove the contaminants from the liquid treated. Since the treatment scheme of contaminant removal must be geared to both variable flow and variable degree of contamination, the apparatus must be either complexly constructed or face an inevitable self-fouling as the liquid passes through the successive steps of aerobic treatment.

SUMMARY OF THE INVENTION

It is an object of the present invention to construct a multi-chambered aerobic treatment apparatus utilizing a curvilinear corrugated pipe having an internal lamination which renders it relatively inert to the liquid being treated.

Another object of the present invention is to provide a multiinternally-chambered corrugated pipe which is adapted for treating contaminated liquids by an aerobic process and which is modular in operation, i.e., one which can be readily expanded to meet additional requirements in the way of volume of liquid for treatment.

Another object of the present invention is to provide a system and apparatus for aerobic treatment of contaminated liquid in which each portion of the system is so monitored that if any portion should become disabled or inefficient, the fluid can be appropriately rerouted to a relatively less contaminated portion of the apparatus, to maintain the efficiency of the system.

Another object of the present invention is to provide either a gravity flow system or positive liquid displacement system in which liquid is successively treated through aeration, clarification, filtration, settling and chlorination techniques to remove effectively the contaminants from the liquid and which can be discharged within sewage treatment standards of both state and federal level.

An overall object of the present invention is to provide a system which is at all times ready to receive available inflow of liquid and which can be readily adjusted to unexpected surges of inflow and not become disabled thereby. Where unexpected surges of inflow occur, the system adjusts itself even if it should be temporarily beyond the capacity of the system to treat such flow. The system can then recoup and produce an efficient treatment of the liquid without dumping it into the environment.

An overall object of the present invention is to produce an inexpensive, self-monitoring system and apparatus for the aerobic treatment of contaminated liquids which can be prefabricated, transported overland to the point of use and there installed at least partially below ground in an excavation which is readily prepared for such purpose. As a result the system is constructable at a central area to realize maximum efficiencies and adjustments in preparation for a proposed use.

Other objects and features of the present invention will become apparent from a consideration of the following description which proceeds with reference to the accompanying drawings.

DRAWINGS

FIGS. 4, 5, 6, 7 are lateral cross section views taken on the respective section lines 4—4, 5—5, 6—6, and 7—7 in FIG. 3;

DETAILED DESCRIPTION OF THE INVENTION

Figure 1:
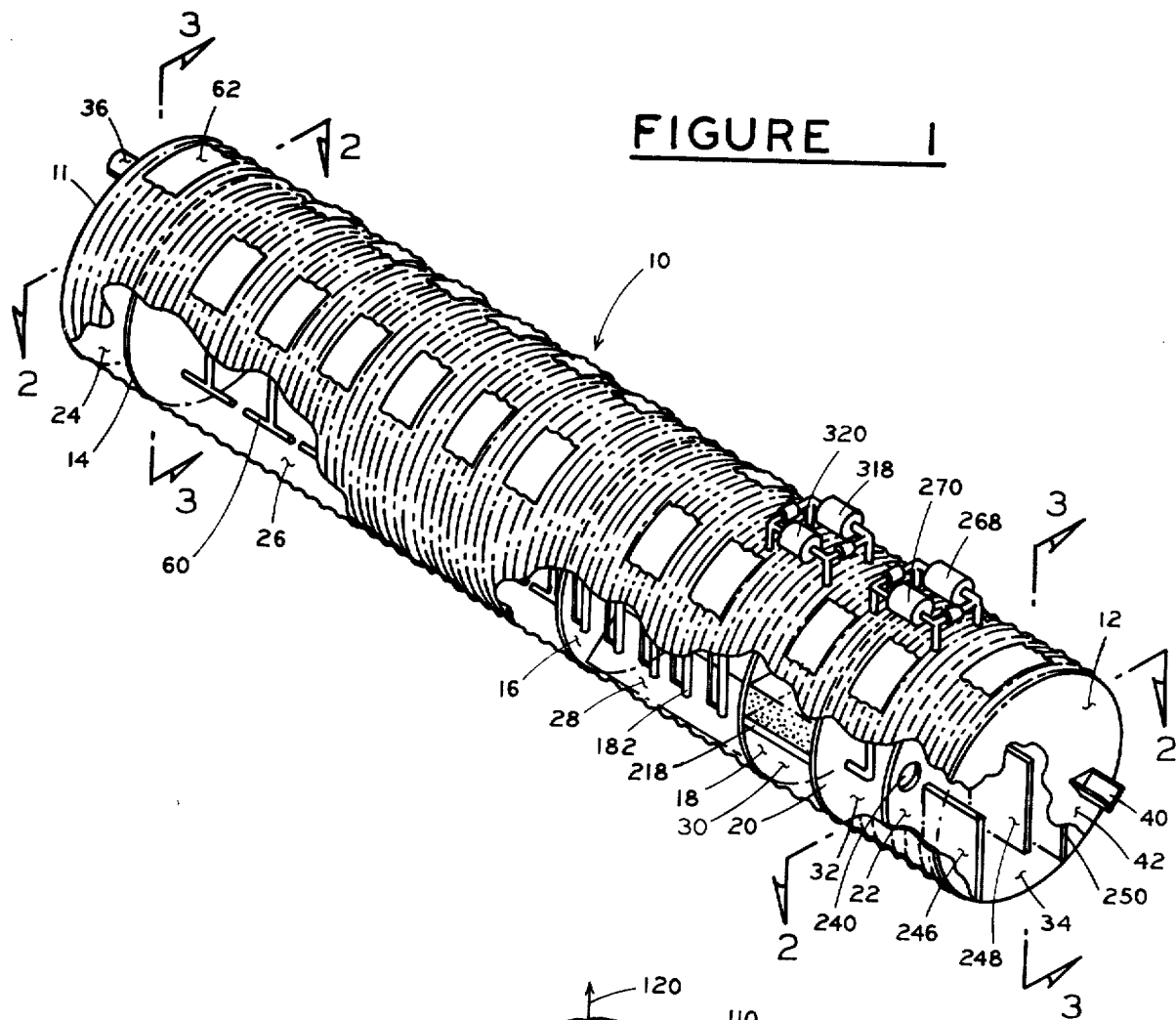
FIG. 1 is an isometric external detail view of a sewage treatment facility, with a portion of the external walls broken away to illustrate internal compartments of the apparatus.

Referring to FIG. 1, an elongated, circular cross section corrugated pipe designated generally by reference numeral 10, having end walls 11, 12 is subdivided by means of transverse walls 14, 16, 18, 20, 22 into various compartments which are designated surge chamber 24, aeration chamber 26, clarifier chamber 28, rapid sand filter chambers 30, clear well 32, and chlorination chambers 34.

The liquid which is to be aerobically treated for the removal of contamination, is introduced to the system through an inlet 36 and the clear processed fluid is discharged to the environment through an outlet opening 40 at end 42.

Figure 2:
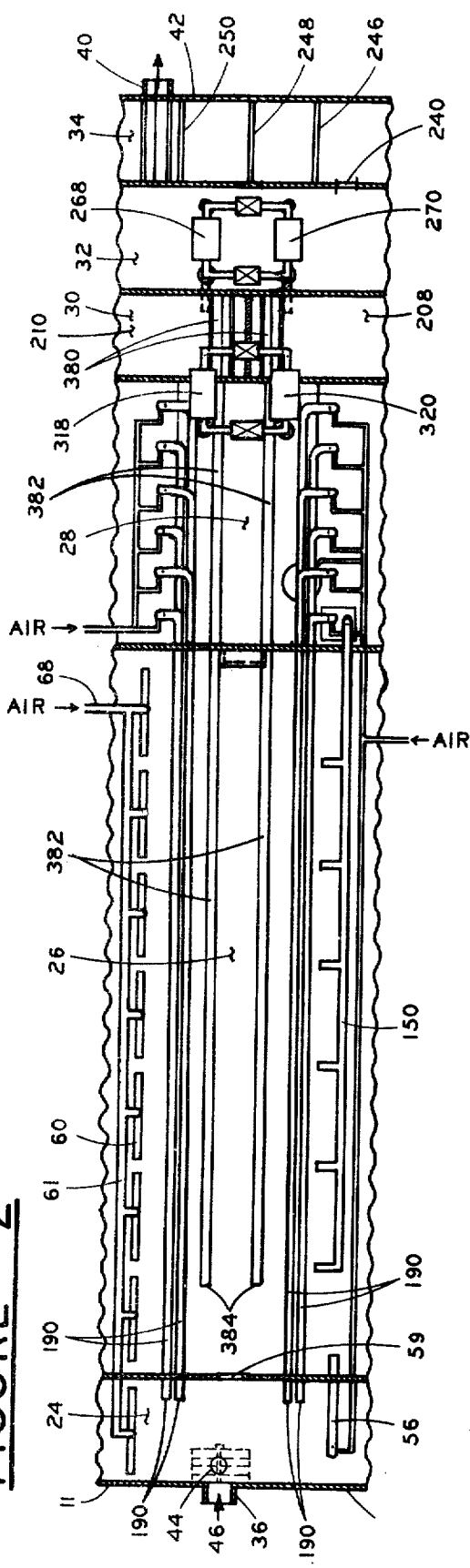
FIG. 2 is a sectional detail view taken on line 2—2 in FIG. 1.
Figure 3:
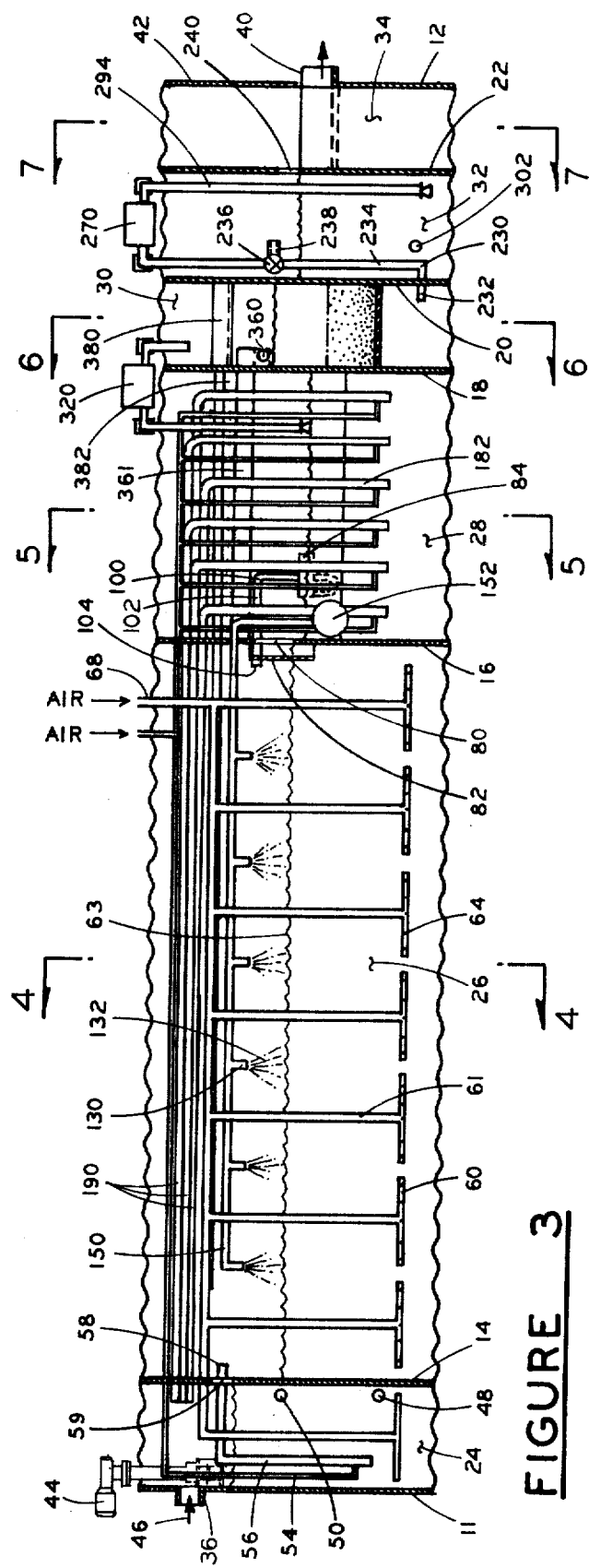
FIG. 3 is a longitudinal sectional view taken on line 3—3 of FIG. 1.

Incoming flow, in one embodiment, is passed through a comminuter 44 (FIGS. 2,3) which is intended to break up the solid content into finer particles. The incoming contaminated fluid is indicated by arrow 46 (FIGS. 2,3). Within surge tank 24 are two sensors, one a low level sensor 48, and the other a high liquid level sensor 50. When liquid is below the level of the sensor 48, pump 52 (FIG. 8), transferring the liquid from surge tank 24, is turned off. When liquid level is above sensor 50, pump 52 is turned on, supplying air under pressure through line 54 and inducting fluid through line 56, having an outlet 58 leading to aeration chamber 26. In this manner, while the air pump 52 is running, liquid is withdrawn from surge tank 24 and transferred to aeration tank 26.

The reason for having spaced sensors 48,50 is to keep the unit from continuously running. In most instances, the rate of inflow of liquid is maintained between the level of the sensor 50 and the sensor 48. Should the inflow of liquid be beyond the capacity of the air pump to transfer liquid, and the liquid rises above sensor 50, there is an overflow opening 59 (FIG. 3) which allows liquid to gravity-spill into the aeration chamber 26. Sludge which settles to the bottom of the surge tank 24 is periodically removed through access opening 62.

It is possible to eliminate the air pump transfer and allow the liquid to flow completely by gravity from the surge tank 24 to the aeration tank 26 through opening 57.

Figure 9:
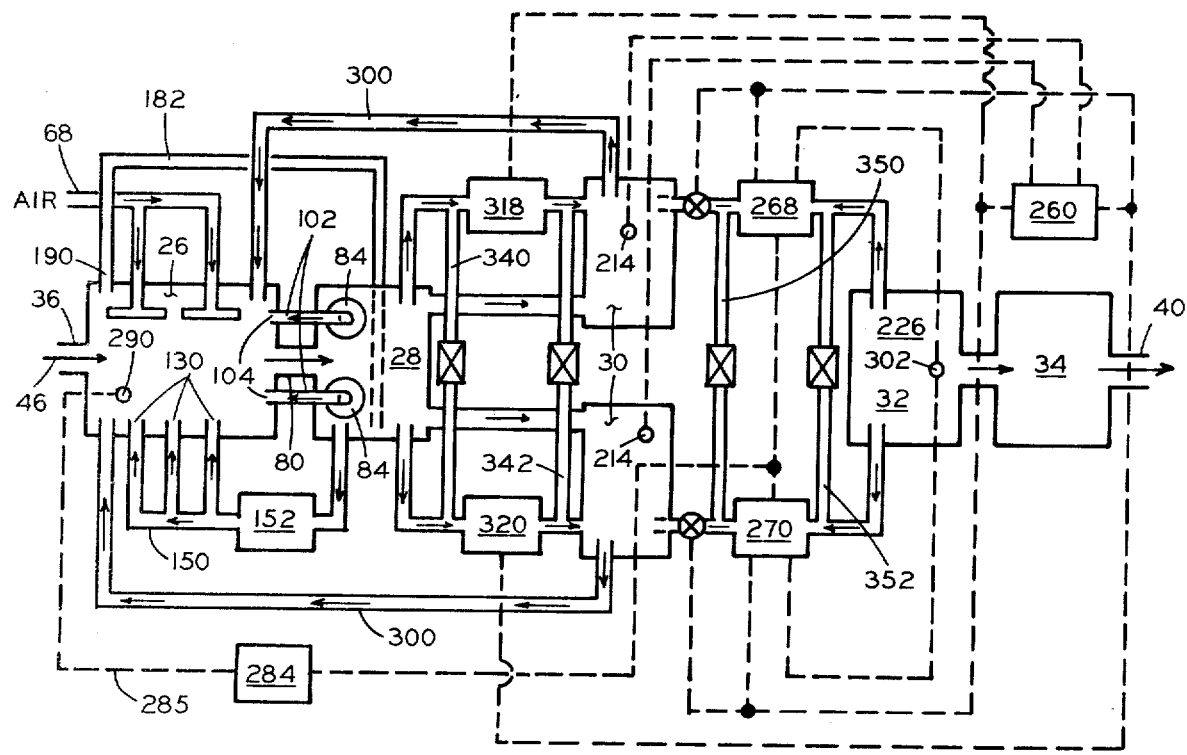
FIG. 9 is a schematic view of a second embodiment of the invention which is similar to that of FIG. 8 but illustrates how the liquid intended for aerobic treatment is transferred through the system by means of positive displacement pumps.

Also, as indicated in FIG. 9, the surge tank can be omitted, and liquid intended to be treated can be introduced directly into the aeration chamber.

The particular selected use depends upon evaluation of the character of the liquid being treated. In the event there is characteristically high content of solids, it is advisable to include a surge tank. A surge tank is also advisable where there is considerable variability in rate of inlet flow.

Figure 8:
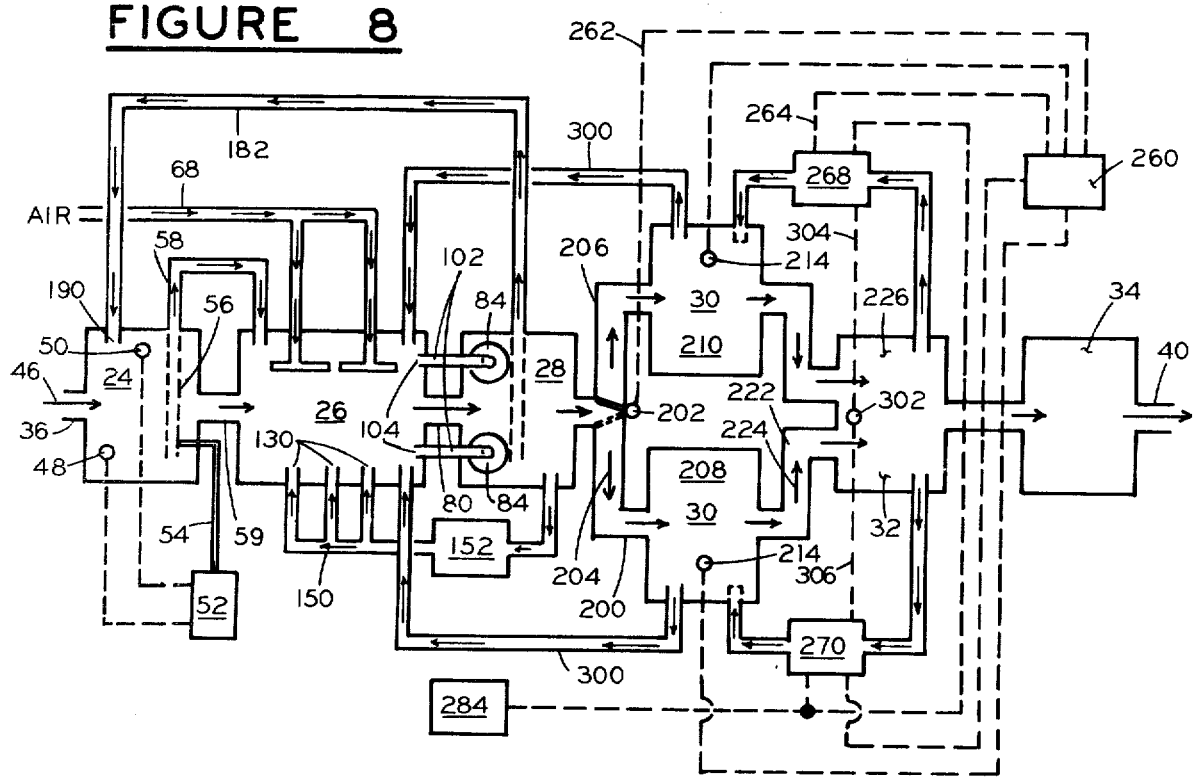
FIG. 8 is a schematic view of one of the embodiments of the process in which the liquid is caused to traverse through the apparatus primarily by gravity flow.

Considering next the aeration tank 26, there is a number of diffuser lines 61 which extend below the level 63 of the liquid (FIG. 3) and which include a number of air outlet ports 64 which provide a continuous flow of entrained air bubbles diffused through the entire liquid mass and thereby achieving aerobic transformation of the aeration chamber contents by chemical dissolution of the pollutants. As shown in FIGS. 8,9 air for the diffuser line 60 is supplied from an air inlet source 68 and can be operatively interconnected to air pump 52 or air valve. The aeration chamber 26 has an outlet 80, with shield 82 over the outlet, to prevent splashing, so that the fully aerated liquid can next pass through partition 16 into a clarifier chamber 28.

Figure 10:
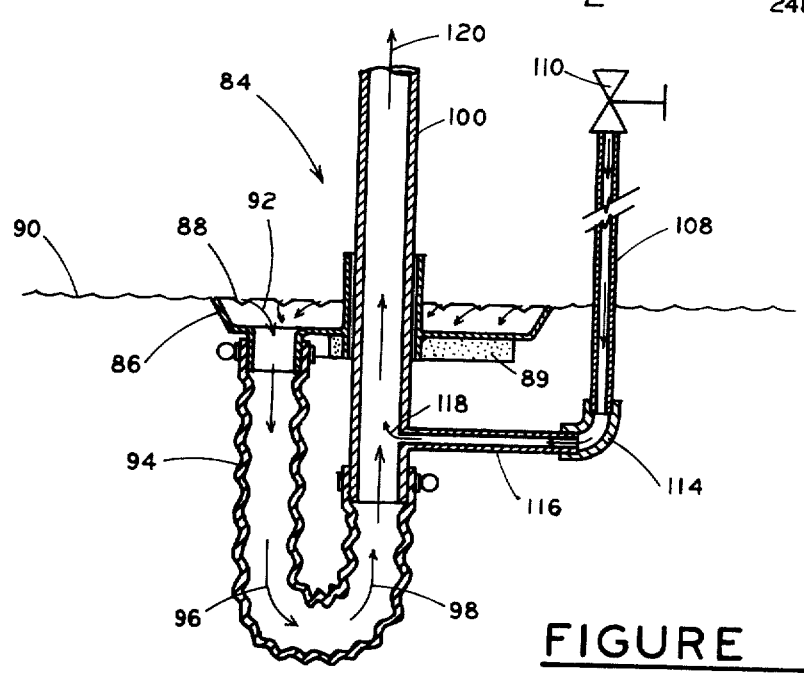
FIG. 10 is a detail cross sectional view showing in enlarged proportions the details of the skimmer, located in the clarifier chamber.

Within clarifier chamber 28 (FIG. 5) is a skimmer (5) each designated generally by reference numeral 84 consisting of a shallow pan 86 (FIG. 10) with notches 88 so that at the liquid level 90 (FIG. 10) the surface sludge and other impurities, flow in the direction of the arrows 92 into the pan and descent downwardly through flexible line 94, traveling in the direction of the arrows 96 in a generally downward direction and then move upwardly in the direction of the arrows 98 and through line 100 returning to the aeration chamber through line 102 (FIG. 9) and discharging into the aeration chamber 26 through outlet openings 104 (FIGS. 8,9). By returning the floatable sludge in this manner, there is opportunity for additional aerobic treatment which further reduces the sludge, causing it to decompose.

The surface sludge is forced to return by means of an air line 108 controlled by valve 110. The air line 108 leads through an elbow 114 and line 116 and the inflow of air indicated by arrow 118 causes the solid and liquid phase material collected within the shallow pan to be drawn upwardly in the manner indicated by arrow 120 and thence is returned to the aeration chamber.

In order to reduce the occurrence of froth within the aeration chamber, there are a plurality of spray outlets 130 which direct spray 132 downwardly against the surface 63 of the fluid within the aeration chamber 26, thereby dispersing foam as it occurs.

The fluid for producing the spray is derived from fluid within clarifier chamber 28 through line 150 from froth pump 152 submerged in clarifier chamber 28.

The aeration chamber also receives a return of settled sludge at the base 180 of clarifier chamber 28 (FIG. 5). By means of an induction line 182 which is used to induct the sludge through opening 184, the sludge collects between the inclined surfaces 185 (FIG. 5) of an insert fitted within the circular cross section of clarifier chamber 28 and the curvilinear interior surface of the pipe 10. The sludge is drawn upwardly within line 182 by means of an air line 186 which injects air at 188, thus drawing the sludge upwardly. The sludge return line has an outlet 190 which returns the solid phase, or thicker liquid phase, sludge to the surge chamber 24 where it undergoes further decomposition under aerobic digestion.

From the clarifier compartment 28, liquid travels either in one direction or the other (FIG. 8) through branched outlet line 200, the direction or branch depending upon the position of the movable gate 202. For example, with the gate 202 in the full-line position shown in FIG. 8, out-flowing liquid moves in the direction of the arrow 204, and with the gate in the dotted-line position of FIG. 8, out-flowing liquid moves in the direction of the arrow 206. Assuming that the gate is in the full-line position and the arrow 204 represents the direction of movement of a liquid, such liquid enters rapid sand filter 208 (FIG. 6) as opposed to rapid sand filter 210.

Assuming that rapid sand filter 208 is the functioning filter chamber, and assuming further that liquid level is not above the level 212 so as to energize the sensor 214, the liquid will pass through filter sand bed 216, perforated support plate 218, and thence into chamber 220. From chamber 220 the liquid is transferred through conductor 222 in a direction of the arrows 224 and into a clear well 32. Referring to FIG. 3, a vertical line 230 having an opening 232 within the lower chamber 220 of the rapid sand filter and a vertical transfer line 234, includes a control valve 236. When the supernatant liquid in the rapid sand filter is at or above the level of the valve 236 and outlet opening 238, the filtered liquid can transfer into the clear well 32. From the clear well, liquid transfers by gravity through opening 240 of partition 22 and into a chlorinator chamber 34, where the flow is then chlorinated from chlorinating tank 241 having supply line 243 through which crystals or liquid is passed into the chlorinating chamber 34. Either liquid, gaseous, chlorine or chlorine-generating solid phase crystals are usable. The chlorinated liquid then passes up and over a series of baffles (FIG. 7) 246, 248, 250, and then exits through V-shaped cross section outlet 40.

While the rapid sand filter 208 is being utilized, the rapid sand filter 210 is in a standby condition. Referring to FIGS. 6, 9, when the liquid level in 208 or 210 reaches a height sufficient to contact probe or sensor 214 or 214A, fluid flow to that rapid sand filter chamber is terminated by means of a remotely operable either-or switch 260. The switch 260, acting through conductors 262, 264 operates a relay (not shown) associated with selector gate valve or gate 202, immediately shutting off flow to the clogged filter as sensed by the sensor 214 or 214A therein, and operation continues as before but with flow shunted to the unclogged filter by positioning the gate 202. Sand filter bed selection can take place at any time during day or night operation. In another operation by the either-or switch 260, simultaneously with sensing by the sensors 214, 214A, one or the other of the backwash pumps 268 or 270, is "armed" by the either-or switch. Thus, should the rapid sand filter 208 at the left-hand side of FIG. 6 be clogged so that its probe 214 is energized, then the backwash motor 270 associated with it will be simultaneously armed by the either-or switch 260 so that when the timer 284 signals at the appointed time and addresses both backwash motors 268,270, only the motor preconditioned by switch 260 will be operated. Generally, the timer is set for a very low period of liquid treatment usage, as, for example, the early morning hours, 2:00 or 2:30 a.m., so that the backwash will take place without interfering with the normal operation. It should be noted that the timer 284 as indicated in FIG. 9 will not permit a backwash to occur should the liquid level in the aeration chamber be too high as sensed by sensor 290, because the aeration chamber 26 is in no position to receive the backwash.

During backwash, the energized backwash motor, as, for example, 270, will induct fluid from the clear well 32 through line 294. Pump 270 closes valve 236 and passes fluid through lines 234,230 and out opening 232 and chamber 220 (FIG. 6).

Counterflow of fluid upwardly through the sand filter 216 removes the contaminants and, together with the supernatant clogged fluid, represented by 207, causes the backwash to return to the aerator chamber 26.

Neither motor 268, 270 can be energized if there is insufficient water in the clear well 226 as determined by probe 302 having connecting lines 304, 306 (FIG. 8) to the motors 268,270.

Comparing FIGS. 8,9: FIG. 8 represents a system operable primarily by gravity, and FIG. 9 represents the system of FIG. 8 modified slightly to be operated by positive displacement pumps. The two different embodiments differ also in that the timer 284 of the gravity system in FIG. 8 is not responsive to the liquid level in the aeration chamber whereas it is, in FIG. 9, through line 285.

Also, the pumps 318,320 are used to transfer fluid from the clarifier chamber to the rapid sand filters 208, 210 and valve operated cross-over lines 340,342 are used in the event that either of the pumps 318,320 fail. Likewise, between backwash pumps 268,270 in the embodiment of FIG. 9 are cross-over lines 350, 352 in the event that either of these pumps fail, a single pump can be used to backwash through either rapid sand filter 210,208.

In the event there is emergency flooding of the system, ball check valve 360 is unseated and liquid is transferred from the aeration chamber 26, to rapid sand filter 30 (FIG. 3) through line 361 and from that chamber liquid passes on gravity through chamber 30 to clear well through line 234. From clear well 32 the liquid goes through opening 240 to chamber 34, where it is passed out of the system through opening 40. When the liquid level in the rapid sand filter rises to the point where it spills over a V-trough 380, liquid is counterflowed to aeration chamber 26. The trough and connecting lines 382 are inclined so that the liquid content flows backwardly, i.e., from the discharge end of the apparatus to the charging end of the apparatus. The pipe sections 382 receiving fluid (FIG. 2) discharge through open ends 384 returning such excess fluid to the aeration chamber 26.

Figure 11:
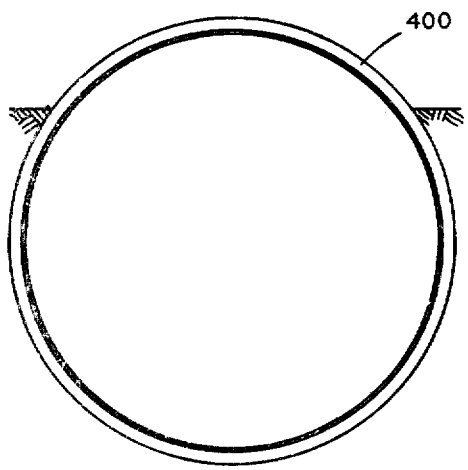
FIGS. 11, 12, 13, 14 are cross sectional views of the various curvilinear shapes of the corrugated pipe which is adapted for compartmentalizing to form the invention.
Figure 12:
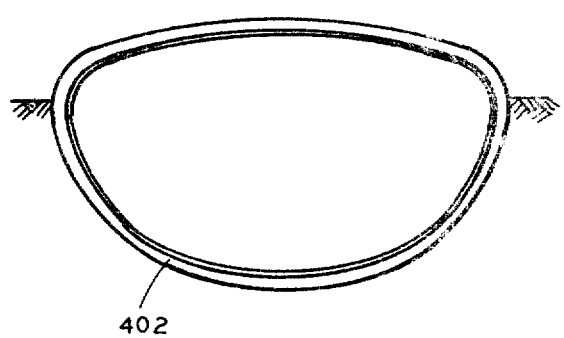
Figure 13:
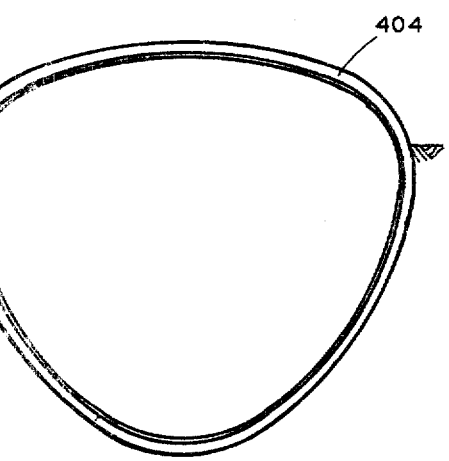
Figure 14:
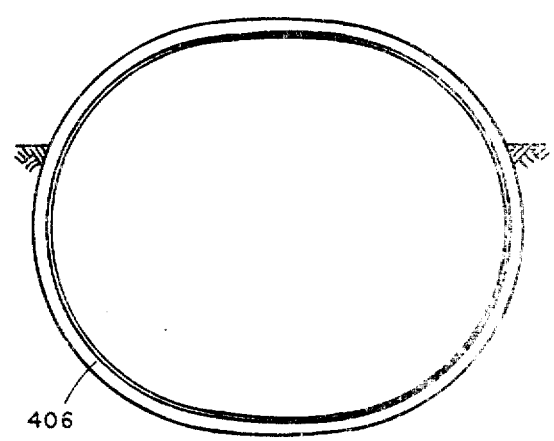

Referring next to FIGS. 11-14, there is demonstrated in FIG. 11 that the pipe can either be circular, as shown in 400, or as an inverted pipe arch (FIG. 12) 402, or as an inverted underpass configuration 404 (FIG. 13), or as an oval configuration (FIG. 14), 406.

Each of these different shapes is contemplated by the present invention and the particular selection is a matter of design preference, taking into account the terrain in which the system is installed, the character of the liquid treated, and the type of solids which will probably be encountered.

All of the suggested shapes are within the contemplation of the present invention and, although these are illustrative, they are by no means restrictive of the range of variability of cross section shape, the general requirement being only that a curvilinear cross section is greatly preferred to the rectilinear shape. The reason for preferring the curvilinear cross section is that such pipe shapes are more readily available, and are better adapted to the fabrication of the overall system and apparatus as described.

OPERATION

In operation, a liquid or semi-liquid, such as domestic sewage, is supplied to the apparatus 10 through inlet 36. A variable inflow through line 36 is expected, and the operation of the apparatus 10 is so designed as to accommodate this variability of inflow. The inflow is at first into a surge tank 24. The incoming fluid is first passed through a comminuter 44 to insure that solids content are broken up into as fine particles as possible so as to enhance the aerobic digestion of the organic components within the system.

In the surge tank 24, the heavier settleable solid phase contaminants are separated from the liquids which pass either by gravity or by pump, from chamber 24 to the aerator chamber 26.

There is expected some variability in height of fluid within surge tank 24. The two probes in surge tank 48, 50 are used to monitor the pump 52 which transfers the fluid from the surge chamber to the aeration chamber 26. The two probes, 48, 50, provide that pump operation does not occur at levels below the level of probe 48, but the system does work after the liquid has reached the level of probe 50, and continues operation until such level falls to the level of probe 48.

Once the liquid is in the aeration chamber 26, it is subjected to a stream of aeration bubbles emanating from openings 64, these air bubbles being utilized to traverse through the liquid and effect aerobic conversion of the solid content of the sewage.

Air is supplied through the diffusers or outlet opening 64 on a continuous basis through air supply line 68. Foam within aeration chamber is suppressed by means of a spray of liquid 132 from the clarifier chamber 28. Continuous downward sprays indicated by reference numeral 132 against the upper surface 63 effectively keeps the foam to a minimum. Foam is undesirable because it could clog the chamber.

Aeration chamber 26 receives a return or counterflow of surface sludge which collects at the surface 90 within the clarifier chamber by means of a pair of skimmers 84 (FIG. 10), each consisting of a shallow pan 88 which receives the surface sludge therein, and is maintained at the surface by means of flotation material 89 at undersurface of the pan 86. The collected sludge follows the course of arrows 96, 98, 120 (FIG. 10), is drawn upwardly through line 100 because of inducted air flow from line 108. The surface sludge is returned through line 100 and outlet opening 104 (FIG. 3). The returned sludge is aerated for additional aerobic digestion.

Also within the clarifier chamber, is a sludge return 40 which extends to the bottom of the clarifier chamber 28 and has an inlet opening 184, such settled sludge being returned to the aeration chamber through line 182 through outlet opening 190 (FIG. 9). The bottom sludge, as indicated in FIG. 5, tends to collect within the narrowing cross section formed at the intersection between the angular inset 186. The bottom sludge concentrates in the pocket formed between the curvilinear sidewall of the pipe and the angled base 186.

In the manner described, both the surface sludge and settled sludge are recycled to the aeration chamber from the clarifier. The liquid in the clarifier chamber is then fed either by gravity or by pump 318, 320 to one or the other of rapid sand filter 208, 210. The particular sand filter 208, 210 which is used is determined by the either-or remote selector 260.

It is an important aspect of the present invention that one of the sand filters 208, 210 is backwashed and ready for operation while the other is being used so the two filters alternate in usage, the one being backwashed or ready to be backwashed while the other is in use.

Assuming that the gate 202 is in the full line position shown in FIG. 8, liquid flows by gravity from clarifier chamber 28 to rapid sand filter 208. This continues until the rapid sand filter becomes clogged, at which time the fluid level rises and sensor 214 (FIG. 6) is contacted, at which time either-or control 260 is operated to effect through conductor 262, energization of a solenoid (not shown) which moves selector gate 202 from the full line position to the dotted line position, preventing further flow through the clogged filter 208, and therafter further flow occurs through the rapid sand filter 210. At this point the either-or control 260 "arms" pump 270 so that when timer 284 which is set for some period of light use of the apparatus, as, for example, an early morning hour, the timer 284 will, when reaching the appointed hour, address both backwash motors 268,270, but will operate only the "armed" motor 270, causing a flow of fluid from the clear well 226 by motor 270, backwashing through the rapid sand filter 208, moving upwardly through the perforated support 218 and the sand bed 216, and removing any collected solids in the sand bed 216 together with the supernatant fluid 207 and causing it to return to the aeration chamber through backwash line vee 380, line 382, outlet 384 (FIG. 9). Backwashing can occur only if there is sufficient fluid in the clear well as determined by the liquid level sensor 302 in the clear well 226.

Referring to FIGS. 8, 9, FIG. 8 being the gravity system and FIG. 9 being the positive pump displacement system, the timer can only operate to produce backwash if there is an acceptably low level of fluid in the aeration chamber. For example, if the aeration chamber level is very high, as sensed by the sensor 290, the timer will not become operative to cause a backwash because in the event of a backwash this would overfill the aeration chamber. The backwash cycle is thus skipped. This is not particularly objectionable since it is likely that an unbackwashed sand filter can continue to operate as much as a day or two at a time, and extending the cycle an additional day is generally not critical.

From the rapid sand filter 208, 210, liquid passes either by pump or by gravity to a clear well 226, and thence to a chlorination chamber 34. After being baffled in opposite vertical direction by a series of baffles 246, 248, 250, chlorinated essentially decontaminated liquid is discharged through opening 40.

The operation as described, together with the apparatus as described, is essentially a continuous process. The system is self-regulating in that sensors determine: which one of the sand filters 208, 210 shall be used; when liquid transfer shall occur from one chamber to the next; and, whether liquid transfer ought to occur either as a flow or as a counter-flow according to the conditions of the liquid level in the respective chambers, as well as their degree of contamination or uncontamination.

Should the level of fluid be extensively high downstream, i.e., within the rapid sand filter as compared with the upstream surge chamber or aeration chamber, liquid is transferred as a counterflow through V-troughs 380 and connecting pipes 382 which carry the fluid back so that all portions of the system are essentially equally loaded and there is not excessive outflow of essentially untreated liquid.

Should the level of liquid in the aerator chamber 26 become excessively high, the liquid can flow by gravity through line 361 and check valve 362 directly into the sand filter chamber where the fluid can pass by gravity through line 234 into clarifier chamber 32; thence to chlorinator chamber 33 and be discharged through line 40 to the environment. Thus, the entire contents of the system can be discharged by gravity.

The system can be used either by gravity flow supplemented by only two pumps, i.e., backwash pumps in the manner indicated in the embodiment of FIG. 8; or positive displacement pumps can be used throughout the system, as indicated in FIG. 9, relying upon gravity only in the event of a total power failure.

In either event, the systems can be employed with curvilinear cross section pipe of various shapes, including but not limited to, those in the embodiments of FIGS. 11, 12, 13, 14.

An important feature of the present invention is that the device can be fully constructed and transported overland by truck to the point of use where a partial excavation is made, and the unit lowered in place. A protective shelter is frequently constructed around the system so that those charged with maintenance can give year-around service to the device including the removal of any solid contaminants, checking water levels, water flows, replacing pumps, checking the degree of purity of the effluent, and the degree of flow and degree of impurity in the incoming fluid intended to be treated. Partial submerging of the apparatus in the ground is advantageous, since it will keep the liquid phase from freezing, and obviate having to heat the system. Moreover, partially excavating and filling the excavation with the major part of the curvilinear cross section pipe, provides an even, sustaining outer support for the liquid contents of the pipe which can have the particular curvilinear cross section pipe best adapted for the particular fluid and degree of contaminants to be carried by the pipe.

Once in place, the system works in a remarkably efficient manner and requires very little, if any, servicing or overseeing. Moreover, should there by sudden surges or overtaxing of the system, liquid is simply shunted through the system (without purifying the liquid, of course), but at the same time without rendering the system inoperative to the next succeeding inflows, which are treated in the usual manner. Thus, excessive loading of the system, while objectionable in itself, does not render the system totally disabled as frequently happens in prior art devices. Instead, the system simply shunts the fluid out without treating a portion thereof, but does treat the remainder, which is within the capacity of the system, in the usual manner. This is an important feature of the present invention, since there are freakish, chancy excess flows which, however undesirable, are tolerated by the system and without rendering the system inoperative.

The corrugated metal is the preferred material of construction, but it should be understood that concrete pipe is also usable and acceptable for some applications.

An important feature of the present invention is that the total handling of the contaminated liquid through the apparatus occurs with a limited number of pumps which therefore entails less cost because of reduced requirements for maintenance and power requirements.

Because of a relatively few number of pumps and motors, the system can be expected to operate for long periods of time without service requirement, and even in the event that there is a total power failure which renders the pumps and motors inoperative, the unit is not disabled but can continue to operate by shunting the liquid entirely through the system by gravity.

All of the pumps which are used are externally located to avoid the corrosive environment frequently associated with contaminated liquid treatment. Since the pumps are externally located, they are readily accessible and are standard pumps operated in conventional manner by commercially available motors.

Emergency overflows are provided through the system so that in no event can the system be permanently disabled by any unexpected inrush of fluid in amounts for which the apparatus was not designed and is not within its normal capacity to manage.

Although the invention has been described in connection with a few selected example embodiments, it is to be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

What is claimed is:

1. Apparatus for aerobic treatment of contaminated liquids such as domestic sewage, comprising: an elongated fluid-tight means for conveying such contaminated liquid, a plurality of means forming interior chambers within said carrier means, at least one of said interior chambers including aerating chamber means for diffusing air through the contaminated liquid, means forming a clarifier chamber, means interconnecting said aerator chamber and said clarifier chamber to provide, in series, a flow of liquid therebetween for successive fluid treatment commencing in said aerator chamber and progressing to said clarifier chamber, means forming a plurality of filter chambers, each including a filtration medium, means for selectively transferring fluid in series from said clarifier chamber tosaid filter chambers as a successive flow for progressive treatment therein, sensor means for sensing both flow and time for the contamination treatment period, and including means for directing successive filtration and backwash modes for a respective one of said filter chambers in such manner that at least one of said filtration chambers is in filtration mode while at least one of the other filtration chambers is in a backwash mode, means for receiving a filtered flow of fluid and for shunting such flow as a counterflow to a selected one of said filter chambers to effect a backwash mode therein, and control means responsive to said sensor means to impart backwash flow to successive filter chambers in a backwash mode while the other filter chambers continue in primary filtering mode.

2. The apparatus in accordance with claim 1 including a clear well and an outlet chamber for receiving fluid from said clear well connected in series therewith, said outlet chamber having a plurality of baffles therein through which clear well fluid is vertically baffled, means providing a discharge opening for porting filtered-and-clarified fluid from said clear well to environment, fluid height sensor means in said clarifier chambers and filter chambers, means forming a valve responsive to both said fluid height sensing means in the clarifier chamber and in the filter chambers, to regulate the direction of flows in filtering modes or backwash modes through respective ones of said filter chambers, and timing means for determining the time at which backwash and filtering operations occur within said respective filter chambers, and independently of said means for measuring fluid height.

3. Apparatus in accordance with claim 2 including means for transferring by gravity the liquid from said aeration means to said clarifier and additional means for transferring by gravity the fluid from said clarifier to said filtration means.

4. Apparatus in accordance with claim 2 including means for returning by gravity excess liquid from said clear well to said aerator means.

5. Apparatus in accordance with claim 1 in which said fluid-tight conveyor means includes means for dismantling said conveyor means and for providing additional conveyor means to selectively increase and decrease the length and thereby the capacity of the respective chambers, and means for joining the sections together while preserving water-tight integrity of connection therebetween.

6. Apparatus in accordance with claim 1, including means for shunting fluid through the apparatus by gravity flow when the chambers therein are clogged or overfilled.

7. Apparatus in accordance with claim 1, including sensing means in said aeration chambers to override backwash operation when the aeration chamber is overfilled with liquid to preclude the addition of backwash therein.

8. Apparatus in accordance with claim 1 including positive displacement pump means for transferring fluid throughout the apparatus and between the chambers.

9. Apparatus in accordance with claim 1 in which said conveyor means consists of a corrugated metal pipe of elongated, curvilinear cross section.

* * * * *